(12) United States Patent
Schiavolin et al.

(10) Patent No.: US 10,112,443 B2
(45) Date of Patent: Oct. 30, 2018

(54) MOTOR VEHICLE TYRE

(75) Inventors: Andrea Schiavolin, Milan (IT); Mario Mariani, Milan (IT); Pierangelo Misani, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 1137 days.

(21) Appl. No.: 13/386,229

(22) PCT Filed: Jul. 28, 2010

(86) PCT No.: PCT/IB2010/001851
§ 371 (c)(1),
(2), (4) Date: Jan. 20, 2012

(87) PCT Pub. No.: WO2011/012977
PCT Pub. Date: Feb. 3, 2011

(65) Prior Publication Data
US 2012/0186712 A1    Jul. 26, 2012

Related U.S. Application Data

(60) Provisional application No. 61/272,754, filed on Oct. 29, 2009.

(30) Foreign Application Priority Data

Jul. 28, 2009 (IT) .............................. RM2009A0396

(51) Int. Cl.
   *B60C 11/03*    (2006.01)
   *B60C 11/117*   (2006.01)

(52) U.S. Cl.
   CPC ........ *B60C 11/033* (2013.01); *B60C 11/0302* (2013.01); *B60C 11/032* (2013.01);
   (Continued)

(58) Field of Classification Search
   CPC ............... B60C 11/0302; B60C 11/033; B60C 2011/0374; B60C 11/032
   See application file for complete search history.

(56) References Cited

U.S. PATENT DOCUMENTS 4,364,426 A * 12/1982 Mills ....................... B60C 11/01
                                                                152/209.11
D455,708 S  *  4/2002 Yuze ............................ D12/535
                   (Continued)

FOREIGN PATENT DOCUMENTS

EP       0 906 836 A2    4/1999
EP       1 826 026 A1    8/2007
                   (Continued)

OTHER PUBLICATIONS

Machine translation for Japan 08-188016 (no date).*
(Continued)

*Primary Examiner* — Steven D Maki
(74) *Attorney, Agent, or Firm* — Finnegan, Henderson, Farabow & Garrett & Dunner, L.L.P.

(57) ABSTRACT

A motor vehicle tire, particularly for front wheels of motor vehicles, has a tread extending around an axis of rotation and includes a central annular portion which straddles an equatorial plane and two annular shoulder portions arranged on axially opposite sides of the central annular portion. The tread band has a void-to-rubber ratio of less than 10%, and the central annular portion has an axial extension less than 40% of the axial development of the tread band and includes at least a pair of first grooves extending substantially longitudinally on opposite sides of the equatorial plane. Each shoulder portion has an axial extension less than 35% of the axial development of the tread band and includes a plurality of second grooves extending substantially transversally forming an average angle with the equatorial plane of more than 90°. The central annular portion has a void-to-rubber (Continued)

ratio more than 0.15 and the first grooves include at least one first segment and at least one second segment which is inclined with respect to the first segment so as to form a concavity directed toward the equatorial plane. The first segment of each first groove is shorter than the second segment and precedes the second segment in the tire rolling direction.

12 Claims, 2 Drawing Sheets

(52) U.S. Cl.
CPC ............... *B60C 2011/0374* (2013.01); *B60C 2011/0381* (2013.01); *B60C 2200/10* (2013.01)

(56) References Cited

U.S. PATENT DOCUMENTS

| | | | | |
|---|---|---|---|---|
| D541,732 S | * | 5/2007 | Steinbach | D12/535 |
| D561,684 S | * | 2/2008 | Gallo | D12/535 |
| D587,645 S | * | 3/2009 | Steinbach | D12/535 |
| D612,796 S | * | 3/2010 | Kajimoto | D12/535 |
| 2005/0098250 A1 | * | 5/2005 | Ito | B60C 11/0302 |
| | | | | 152/209.11 |
| 2008/0230161 A1 | * | 9/2008 | Ishiyama | B60C 11/0302 |
| | | | | 152/209.11 |
| 2009/0308515 A1 | * | 12/2009 | Matsunaga | B60C 11/0302 |
| | | | | 152/209.18 |
| 2010/0126645 A1 | | 5/2010 | Barboza et al. | |
| 2010/0193095 A1 | * | 8/2010 | Nakagawa | B60C 11/033 |
| | | | | 152/209.5 |
| 2010/0282390 A1 | * | 11/2010 | Mariani | B60C 11/0302 |
| | | | | 152/454 |

FOREIGN PATENT DOCUMENTS

| | | | |
|---|---|---|---|
| EP | 2 135 752 A1 | | 12/2009 |
| JP | 05-201207 A | * | 8/1993 |
| JP | 08-188016 A | * | 7/1996 |
| JP | 2007-331596 A | * | 12/2007 |
| WO | WO 2008/124899 A1 | | 10/2008 |
| WO | WO-2009/013961 A1 | * | 1/2009 |
| WO | WO 2009/013961 A1 | | 1/2009 |
| WO | WO-2009/060481 A1 | * | 5/2009 |
| WO | WO 2009/060481 A1 | | 5/2009 |
| WO | WO2011/012979 A1 | | 2/2011 |
| WO | WO 2011/012980 A1 | | 2/2011 |

OTHER PUBLICATIONS

Machine translation for Japan 05-201207 (no date).*
Machine translation for Japan 2007-331596 (no date).*
International Search Report from the European Patent Office for International Application No. PCT/IB2010/001851, dated Nov. 23, 2010.

* cited by examiner

MOTOR VEHICLE TYRE

CROSS REFERENCE TO RELATED APPLICATIONS

This application is a national phase application based on PCT/IB2010/001851, filed Jul. 28, 2010, and claims the priority of Italian Patent Application No. RM2009A000396, filed Jul. 28, 2009, and the benefit of U.S. Provisional Application No. 61/272,754, filed Oct. 29, 2009, the content of all of which is incorporated herein by reference.

BACKGROUND OF THE INVENTION

Field of the Invention

The present invention relates to motor vehicle tyres. In particular, the present invention relates to tyres intended to be mounted on the front wheel of "supersport" motor vehicles having large engine capacity (e.g. 600 cm$^3$ or higher), and/or high power (e.g. 170-180 hp or higher), also used on tracks.

Description of the Related Art

In recent times a trend has been observed to introduce in the market motor vehicles for supersport use having increasingly high power. For example, motor vehicles for road use having an engine capacity of 1000 cm$^3$ or higher, with powers of 180 hp, are in fact already available on the market.

For ensuring such high performances, the tyres mounted on the wheels of such motor vehicles shall have very good features as regards the grip to the ground, so as to be able to effectively transfer the high traction torque to the ground, both while running on a straight path and while accelerating on leaving a bend, as well as to ensure an effective braking action. The grip becomes a really critical issue above all when running on wet road surfaces.

For ensuring to the motorcyclist that such performances are reached in a fully safe condition, the tyres shall ensure, together with a very good grip to the ground, behaviour stability both while running on a straight path and while running on bends, particularly in conditions of high acceleration/deceleration. In fact, a stable behaviour of the tyre indicates its capacity to effectively dampen perturbations transmitted by the unevenness of the road surface while running, so that such perturbations are not propagated to the motor vehicle, thus compromising the driving stability.

The patent application EP 1826026 describes a tyre for motor vehicles, especially suitable for use as a front tyre of a racing motor vehicle, having a tread portion provided with at least a pair of circumferential grooves extending generally in a circumferential direction of the tyre and oppositely disposed to the equatorial plane of the tyre, and a plurality of grooves inclined with respect to the circumferential direction and extending from an outer side to an inner side in a width direction on the tread band. At least half of the inclined grooves extend up to cross the equatorial plane of the tyre. According to EP 1826026, such choice allows obtaining a tyre with a very light handling and stable when braking.

SUMMARY OF THE INVENTION

The Applicant has faced the problem of providing tyres for motor vehicles for the sport segment, characterised by having a tread band with a very low number of grooves, but capable of ensuring suitable performances and behaviour stability features even when used on wet grounds.

Particularly, the Applicant has faced the problem of increasing the effectiveness of the draining action in front tyres having a tread band with a low void-to-rubber ratio and ensuring, at the same time, suitable behaviour stability and wear evenness features substantially in any running condition of the motor vehicle, and more particularly in critical conditions, such as during high accelerations/decelerations on leaving/entering in a bend, and/or while running on bends at high speed.

The Applicant has found that such problem can be solved by providing a first plurality of grooves circumferentially spaced apart from each other in a central portion of the tread band and arranged on opposite sides of the equatorial plane of the tyre, and at least a second plurality of inclined grooves arranged in the shoulder portions of the tread band.

The grooves of the central portions are arranged so as to form, on each side, a concavity directed towards the equatorial plane. Furthermore, such grooves have circumferential segments with different inclination and different extension: in particular, the extension of the circumferential segments of such grooves intended to enter first in the footprint area is shorter than the extension of the circumferential segments of such grooves intended to enter subsequently in the footprint area.

In a first aspect thereof, the present invention refers to a motor vehicle tyre having a tread band extending around an axis of rotation and comprising a central annular portion (A) which straddles an equatorial plane (X-X) and two annular shoulder portions (B) arranged on axially opposite sides of the central annular portion (A), the tread band having a void-to-rubber ratio of less than 10%;

the central annular portion (A) having an axial extension less than 50% of the lateral development of the tread band and comprising at least a pair of first grooves extending substantially longitudinally on opposite sides of the equatorial plane (X-X), each shoulder portion (B) having an axial extension less than 35% of the lateral development of the tread band and comprising a plurality of second grooves extending substantially transversally forming an average angle with the equatorial plane (X-X) between 90° and 140°;

wherein the central annular portion has a void-to-rubber ratio more than 0.15 and the first grooves comprise at least one first segment and at least one second segment which is inclined with respect to said first segment so as to form a concavity directed towards the equatorial plane (X-X), the first segment of each first groove being shorter than the second segment and preceding the second segment in the tyre rolling direction.

In the invention, the "precedence" of the first groove segment with respect to the second groove segment "in the tyre rolling direction" is to be referred to the entrance in the footprint area. It is meant, therefore, that while the tyre is rolling for making the motor vehicle to move forward, the first segment, of the two forming the groove, is the first to contact the ground.

For the purposes of the present invention, by "tread pattern" it is meant the representation of each point of the tread band (grooves included) on a plane perpendicular to the equatorial plane of the tyre and tangent to the maximum diameter of the tyre. In the representation:

in the lateral direction the distance of each point of the tread band from the equatorial plane corresponds to the distance of such point from the equatorial plane measured on the lateral development of the band itself;

in the circumferential direction the distance between any two points of the tread band corresponds to the distance between the projections of the two points on the circumference corresponding to the maximum diameter of the tyre, which projection is obtained by means of radial planes passing at the two points.

Angular measurements, and/or linear quantities (distances, widths, lengths, etc.), and/or surfaces are to be intended as referred to the tread patter as defined above.

Furthermore, referring to the angular arrangement of the grooves formed in the tread band with respect to the equatorial plane of the tyre, such angular arrangement is to be intended, for each point of the groove, as referred to the angle (comprised between 0° and 180°) defined by a rotation performed starting from the equatorial plane and reaching the direction tangent to the groove passing at that point. The rotation is to be intended as performed by a vector initially having the direction defined, in the tread pattern, by the equatorial plane, and oriented opposite to the predetermined rotation direction of the tyre.

For the purposes of the present invention, the following definitions are further applied:

By "motor vehicle tyre" it is meant a tyre having a high curvature ratio (typically higher than 0.200), which allows high camber angles (for example)50°-60° to be reached when the motor vehicle runs on a bend.

By "equatorial plane" of the tyre it is meant a plane perpendicular to the rotation axis of the tyre and dividing the tyre into two symmetrically equal portions.

By "circumferential" direction it is meant a direction generically directed according to the rotation direction of the tyre, or in any case only slightly inclined with respect to the rotation direction of the tyre.

By "void-to-rubber ratio" it is meant the ratio between the total surface of the notches of a determined portion of the tread pattern of the tyre (possibly of the whole tread pattern) and the total surface of the determined portion of the tread pattern (possibly of the whole tread pattern).

By "lateral development" of the tread band it is meant the length of the arc defining the radially outermost profile of the tread band in a cross section of the tyre.

By "axial extension" of a tread band portion it is meant the extension of such portion on the lateral development of the tread band.

By "curvature ratio" of the tyre it is meant the ratio between the distance of the radially highest point of the tread band from the maximum chord of the tyre, and the same maximum chord of the tyre, in a cross section of the tyre.

By "circumferential extension" of a groove it is meant the extension of the projection in the circumferential direction of the groove itself.

If not differently stated, by "extension" of a groove it is meant the length of the groove measured along its extension.

By "average inclination" of a groove it is meant the arithmetical mean of the inclinations of the segments forming the groove.

By "pitch" of the tyre it is meant the group of grooves and rubber parts arranged so as to form a portion of the pattern which is repeated on the tread band, substantially the same and without interruption along the circumferential development of the tread band. Along the circumferential development of the tread band, the pitches may have different circumferential lengths.

The present invention, in one or more preferred aspects, may comprise one or more of the features hereinafter presented.

For avoiding an excessive reduction in the number of grooves of the tread pattern, with a resulting safety reduction when running on wet grounds, the tread pattern conveniently defines on the tread band a void-to-rubber ratio of more than 4%.

Conveniently, the first grooves may have a circumferential extension less than 6% of the overall circumferential development of the tyre. Preferably, the first segment of each first groove has an inclination of less than 45° with the equatorial plane (X-X).

Keeping the groove extension the same, the choice of an almost circumferential inclination of the grooves allows the impact frequency of the groove ends on the ground while the tyre is rolling at high speed on a straight path to be reduced, which results in an improvement as regards the behaviour stability of the tyre and in a better wear resistance.

Advantageously, the second segment of each first groove has an average inclination of more than 160° with the equatorial plane (X-X).

Conveniently, the first grooves of each pair may be mutually staggered in the circumferential direction.

Even more conveniently, the first grooves of each pair may be mutually staggered in the circumferential direction by not more than half of the pitch, preferably not more than a quarter of the pitch.

The staggered arrangement in the circumferential direction advantageously increases the stiffness of the central portion at the equatorial plane.

Furthermore, for improving the contact surface when running on a straight path on dry grounds, with related increased roadholding, stability and acceleration power, the first grooves of each pair define a central annular sub-portion L straddling the equatorial plane (X-X) substantially without grooves, i.e. with a void-to-rubber ratio substantially equal to zero.

The central annular sub-portion L, substantially without grooves, has an axial extension equal to at least 5% of the overall axial extension of the tread band.

Preferably, it has an extension equal to at most 15%, for example equal to 10% of the overall axial extension of the tread band.

Preferably, the second grooves may have an average inclination between 90° and 140°.

Even more preferably, the second grooves have an average inclination of more than 120°.

Conveniently, the second grooves may have a first, axially innermost, segment and a second, axially outermost, segment. The second segment may be shorter than the first segment. The first and second segments of each second groove may have different inclinations with respect to the equatorial plane. In particular, the first segment of each second groove may have an inclination angle with respect to the equatorial plane smaller than that of the second segment.

Advantageously, the first segment of each second groove has an inclination of more than 120°.

Preferably, the second segment of each second groove has an inclination of more than 130°.

Conveniently, the shoulder portion further has a plurality of substantially transverse third grooves.

Advantageously, the third grooves may be shorter than the second grooves.

Preferably, the third grooves may alternate in the circumferential direction with the second grooves.

Preferably, the third grooves may have an average inclination between 90° and 140°.

Even more preferably, the third grooves have an average inclination of more than 120°.

Conveniently, the third grooves may have a first, axially innermost, segment and a second, axially outermost, segment. The first and second segments of each third groove may have different inclinations with respect to the equatorial plane. In particular, the first segment of each third groove may have an inclination angle with respect to the equatorial plane greater than that of the second segment.

Advantageously, the first segment of each third groove has an inclination of more than 130°.

Preferably, the second segment of each of the third groove has an inclination of more than 120°.

BRIEF DESCRIPTION OF THE DRAWINGS

Further features and advantages of the tyre of the present invention shall become clearer from the following detailed description of some preferred embodiments thereof, made hereafter for indicating and non-limiting purposes with reference to the accompanying drawings. In such drawings.

DETAILED DESCRIPTION OF THE INVENTION

Figure 1:
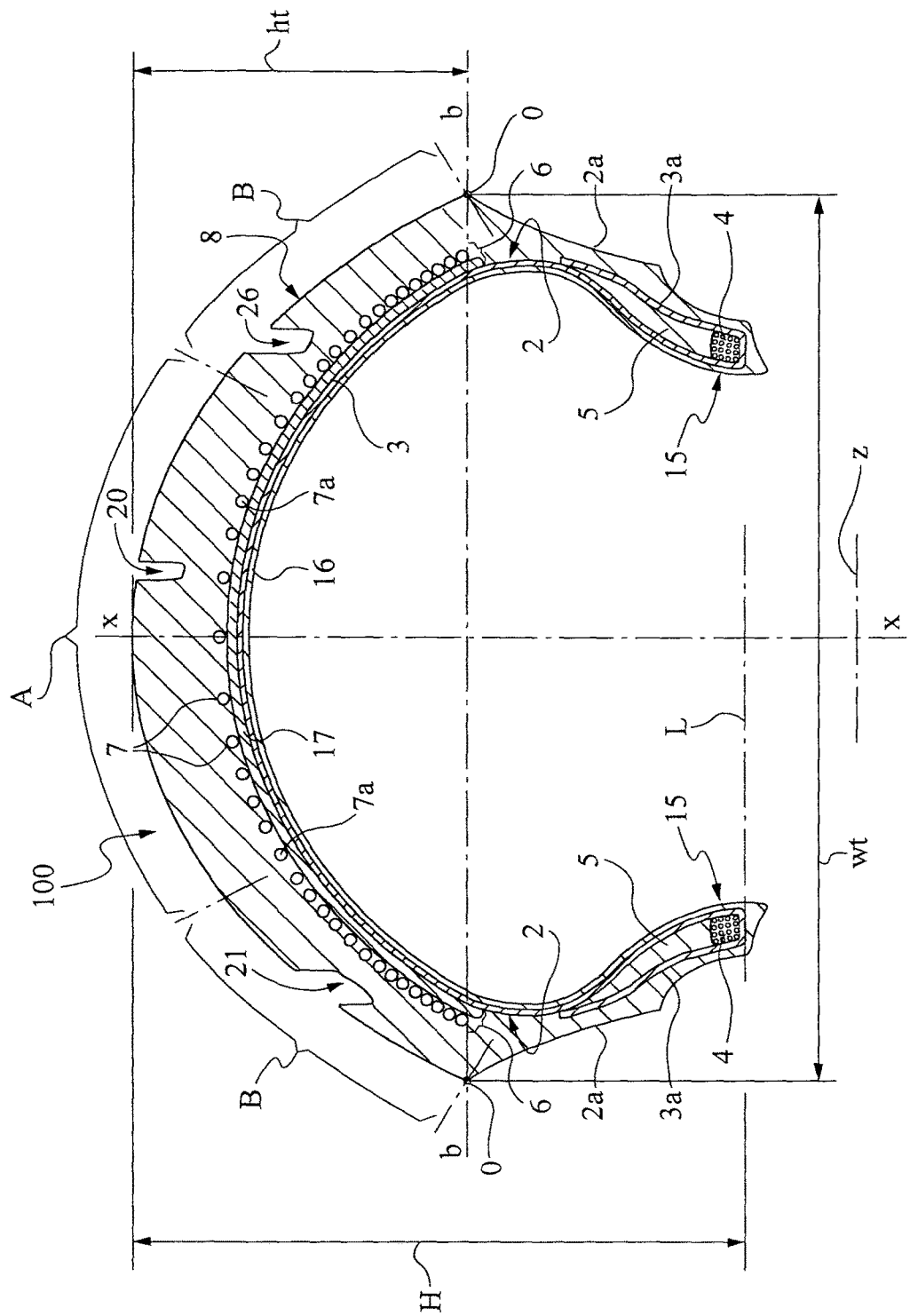
FIG. 1 shows a radial sectional view of a tyre according to the invention.
Figure 2:
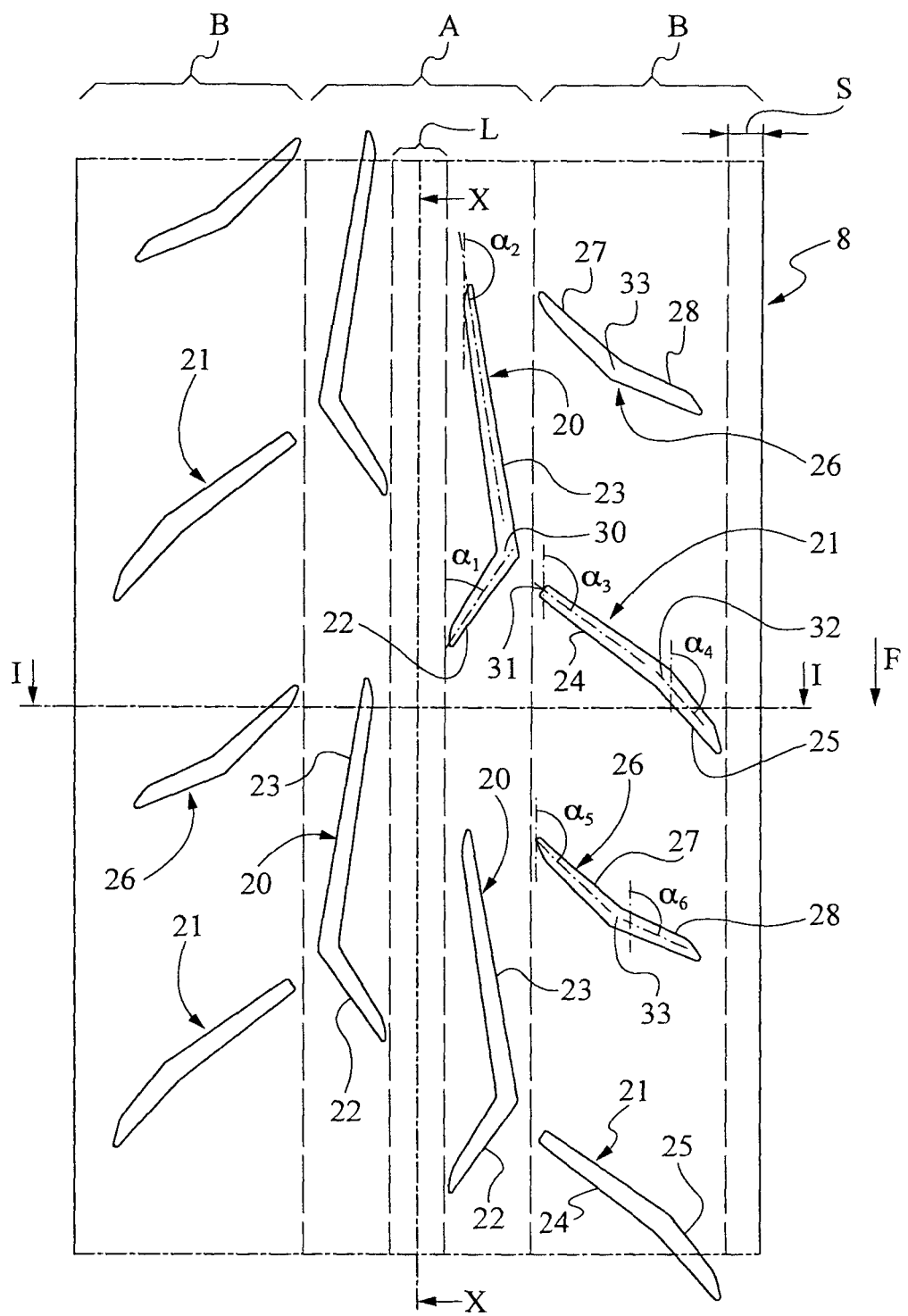
FIG. 2 shows a plan development of a portion of the tread band of a tyre according to the invention.

In FIG. 1 and FIG. 2, a tyre for motor vehicle wheels is globally indicated at 100. In particular, this is a tyre preferably intended to be used on the front wheel of a motor vehicle for the sport or supersport segment.

An equatorial plane X-X and a rotation axis Z are defined in the tyre 100. Moreover, there are defined a circumferential direction (indicated in FIG. 2 by means of an arrow F pointing in the rotation direction of the tyre) and an axial direction perpendicular to the equatorial plane X-X.

The tyre 100 comprises a carcass structure 2 including at least one carcass ply 3.

The carcass structure 2 is preferably lined on its inner walls with a sealing layer 16, also called "liner", essentially consisting of a layer of an airproof elastomeric material, adapted to ensure the tight seal of the tyre itself after it has been inflated.

The carcass plies 3 are engaged, at the respective axially opposite lateral edges 3a, with respective annular reinforcing structures 4 intended to hold the tyre on a corresponding fitting rim. The annular reinforcing structures 4 are typically called "bead rings".

A tapered elastomeric filling 5 taking up the space defined between the carcass plies 3 and the respective turned up lateral edge 3a of the carcass plies 3 is applied onto the radially outer perimeter edge of the bead rings 4.

In an alternative embodiment, not shown, the carcass ply has its opposite lateral edges associated without a turn-up with special annular reinforcing structures provided with two metal annular inserts. In this case, a filling of elastomeric material can be arranged in an axially outer position with respect to the first annular insert. The second annular insert is instead arranged in an axially outer position with respect to the end of the carcass ply. Finally, in an axially outer position with respect to said second annular insert, and not necessarily in contact with the same, a further filling can be provided which finishes the formation of the annular reinforcing structure.

The region of the tyre comprising the bead ring 4 and the filling 5 defines the so-called "bead", globally indicated at 15 in FIG. 1, which is intended for anchoring the tyre to a corresponding fitting rim, not shown.

A belt structure 6 is provided in a radially outer position with respect to the aforementioned carcass structure.

A tread band 8, at which the tyre 1 contacts the ground, is provided in a radially outer position with respect to the belt structure 6.

The tyre may further comprise a pair of sidewalls 2a laterally applied to the carcass structure 2 on axially opposite sides of the equatorial plane X-X. The sidewalls extend from the tread band 8 to the bead 15 of the tyre.

The tyre 100 of the present invention is characterised by a high transverse curvature and lowered sidewalls.

The transverse curvature of a tyre is defined by the particular value of the ratio between the distance ht (FIG. 1) of the top of the tread band from the line b-b passing through the ends O of the tread, measured on the equatorial plane X-X, and the distance wt between said ends of the tread band. Should the ends of the tread band not be easily identifiable, for example due to the lack of a precise reference such as for example the edge indicated at O in FIG. 1, as the distance wt can certainly be taken the length of the maximum chord of the tyre.

The value of the aforementioned transversal curvature is called "curvature ratio" of the tyre.

The tyre 100 of the present invention preferably has a curvature ratio greater than or equal to 0.2, preferably greater than or equal to 0.28, for example 0.40. Such a curvature ratio is typically less than or equal to 0.8, preferably less than or equal to 0.5.

As regards the sidewalls, on the other hand, the tyre of the present invention is preferably a tyre with particularly low sidewalls (FIG. 1). By tyres with low or lowered sidewalls in the present description are meant tyres wherein the ratio between the distance (H-ht) and the height H, measured on the equatorial plane X-X between the top of the tread band and the fitting diameter, defined by the reference line 1 passing through the beads of the tyre, is less than 0.7, more preferably less than 0.5, for example equal to 0.38.

Each carcass ply 3 is preferably made from an elastomeric material and comprises a plurality of reinforcing elements (not shown) arranged parallel to one another.

The reinforcing elements included in the carcass plies 3 preferably comprise textile cords selected from those usually adopted in the manufacture of carcasses for tyres, for example nylon, rayon, aramid, PET, PEN, with an elementary thread having a diameter between 0.35 mm and 1.5 mm. The reinforcing elements in the carcass ply 3 are preferably arranged in a radial direction, i.e. according to an angle between 70° and 110°, more preferably between 80° and 100°, with respect to the equatorial plane X-X.

The belt structure 6 preferably comprises one or more rubberized cords 7, arranged parallel to one another and in side-by-side relationship in the axial direction on the crown portion 16 of the carcass structure 2, so as to form a plurality of coils 7a. Such coils are substantially oriented according to the circumferential direction of the tyre (typically with an angle between 0° and 5° with respect to the equatorial plane X-X of the tyre), such a direction usually being known as "at zero degrees" with reference to how it lies with respect to the equatorial plane X-X of the tyre. The aforementioned coils preferably extend over the entire crown portion of the carcass structure 2.

Preferably, the belt structure 6 consists of a single cord 7, or of a rubberized fabric strip comprising cords arranged in side-by-side relationship, preferably up to five, spirally wound from one end to the other on the crown portion 16 of the carcass structure 2.

Alternatively, the belt structure 6 may comprise at least two radially superimposed layers, each consisting of elastomeric material reinforced with cords arranged parallel to one another. The layers are arranged so that the cords of the first belt layer are oriented obliquely with respect to the equatorial plane of the tyre, whereas the cords of the second layer also have an oblique orientation, but symmetrically crossed with respect to the cords of the first layer, to form the so-called "cross-belt".

The cords 7 of the belt structure 6 are textile or metal cords.

Preferably, for the use in a belt at zero degrees, such cords are made through steel wires with high carbon content, i.e. steel wires with a carbon content at least equal to 0.7%. Preferably, such cords 7 are metal cords made from steel of the high elongation (HE) type. The high elongation (HE) cords have a load-elongation diagram comprising a curvilinear portion arranged between two substantially straight portions having different inclinations with respect to the axes of the diagram.

When textile cords are used, these can be made from a synthetic fiber, for example nylon, rayon, PEN, PET, preferably a synthetic fiber with high modulus, in particular synthetic aramid fiber (for example Kevlar® fibers). Alternatively, hybrid cords can be used comprising at least one thread with low modulus, i.e. with a modulus not greater than 15000 N/mm$^2$ (for example nylon or rayon), interwoven with at least one thread with high modulus (for example Kevlar®), i.e. with a modulus not smaller than 25000 N/mm$^2$.

The belt structure 6 may also comprise a first support layer 17 substantially consisting of a sheet of elastomeric material interposed between the layer of cords 7 and the carcass ply 3 and on which the coils 7a are wound. Such layer may extend on a surface having an axial extension substantially corresponding to the surface on which the coils 7a extend.

In a preferred embodiment of the tyre 100 of the present invention, the layer 17 comprises short aramid fibres, for example made from Kevlar®, dispersed in the elastomeric material.

The pattern of the tread band 8 of the tyre of the present invention is defined by a plurality of grooves variously distributed along the circumferential and axial development of the tread band 8.

In one pitch of the tread pattern, such grooves define a module which is repeated substantially the same along the circumferential direction of the tyre 100.

FIG. 2 shows an example of a tread pattern which can be used in a tyre according to the invention. A tread pattern as in the example shown in FIG. 2 globally defines on the tread band 8 a void-to-rubber ratio of less than 10%. Preferably, such void-to-rubber ratio is less than 9%.

For avoiding an excessive reduction in the number of grooves of the tread pattern, with a resulting safety reduction when running on wet grounds, the tread pattern conveniently defines on the tread band a void-to-rubber ratio of more than 4%. In the example shown in FIG. 2, the void-to-rubber ratio is equal to about 7%.

As better shown in FIG. 2, a central annular portion A straddling the equatorial plane X-X and two axially outer annular shoulder portions B, arranged on axially opposite sides of the central annular portion A, can be identified in the tread band 8.

The central annular portion A is intended to contact the road surface when the motor vehicle runs on a straight path or with a slight lean, whereas the shoulder portions B are mainly intended to contact the road surface when the motor vehicle runs on a bend with a more marked lean.

Preferably, the central annular portion A has an axial extension at most equal to 50% of the lateral development of the tread band 8. The central annular portion A has a plurality of pairs of first grooves 20. Preferably, in such portion the void-to-rubber ratio is between 0.15 and 0.25.

In each pair, the grooves 20 are arranged on opposite sides of the equatorial plane X-X so as to define a central annular sub-portion L straddling the equatorial plane X-X with a void-to-rubber ratio substantially equal to zero.

The central annular sub-portion L has an axial extension equal to at least 5% of the lateral development of the tread band 8, at most equal to 15%, for example equal to 10% of the lateral development of the tread band 8.

This choice can be particularly advantageous for the front tyre, since it allows the area of the contact region between tyre and ground when running on a straight path at high speed to considerably increased, so as to effectively transfer to the ground the traction torque while accelerating and/or the braking torque while decelerating. Moreover, the formation of a closed tread band ring in the central sub-portion L advantageously increases the stiffness thereof.

The first grooves 20 of each pair are preferably staggered in the circumferential direction.

Preferably, the first grooves 20 of each pair are staggered in the circumferential direction at most by half of the pitch, preferably by a quarter of the pitch.

Each groove 20 has a circumferential extension less than 6% of the circumferential development.

In other words, in the central annular portion A of the tyre according to the invention, the formation of grooves (with a straight or a zig-zagging arrangement) arranged on the whole circumferential extension of the tread is avoided. This choice allows an increase of the tyre grip when running on a straight path, particularly while braking. The Applicant has further observed a very good running stability on a straight path when a front tyre having first grooves spaced apart from each other is used.

Preferably, each groove 20 has a circumferential extension of more than 3% of the circumferential development.

Each groove 20 has a first segment 22 and a second segment 23 inclined with respect to the first segment 22 so as to form a concavity directed towards the equatorial plane X-X.

According to an important aspect of the present invention the first segment 22 of the grooves 20 is shorter than the second segment 23 and precedes the second segment in the circumferential direction according to the tyre rolling direction indicated by the arrow F in FIG. 2.

The first segment 22 has a circumferential extension shorter than the second segment 23 and is inclined by an average angle α1 with respect to the equatorial plane X-X.

Preferably α1 is less than 45°, more preferably less than 40°, for example equal to about 35°.

Conveniently, the choice of a small angle for the first segment 22 allows the impact frequency of the notch ends on the ground while the tyre is rolling at high speed on a straight path to be reduced, which results in an improvement as regards the behaviour stability of the tyre and in a better wear resistance.

The second segment 23 has a circumferential extension greater than the first segment 22. Preferably, the extension of the second segment 23 is equal to at least 1.5 times the circumferential extension of the first segment 22. The second segment 23 has an opposite inclination with respect to that of the first segment 22. In other words, the second segment 23 of the first groove 20 defines an average angle $\alpha_2$ of more than 90° with the equatorial plane X-X. In preferred embodiments, the angle $\alpha_2$ is more than 160°.

In the Applicant's view, the different extension of the first segment 22 and of the second segment 23, preferably together with their opposite inclination, allows a very good water draining when running on a straight path on wet grounds to be obtained. In particular, the first segments 22, which are longer, allow the water to be effectively drained while accelerating, whereas the second segments 23, which are shorter, are more active in the baking phases. Furthermore, it has been observed a very good wear evenness in the central annular portion A while running on dry grounds.

Preferably, the grooves 20 do not have a constant width along their extension, having instead a variable width.

In detail, the first segment 22 has a width increasing from its free end towards the intersection area 30 with the second segment 23.

In detail, the first segment 22 may have a width greater than or equal to about 3 mm at its free end.

In a similar way, the second segment 23 has width increasing from its free end towards the intersection area 30 with the first segment 22.

In detail, the second segment 23 may have a width greater than or equal to about 3 mm at its free end.

In the embodiment shown in FIG. 2 the first grooves 20 have a depth which decreases diminishing from the equatorial plane X-X towards the shoulders. Preferably, the first grooves 20 have a depth less than or equal to 6 mm, more preferably less than 5 mm.

The aforementioned choices as to the depth and width of the first grooves 20 contribute at obtaining a good behaviour of the tread band 8 on wet road surfaces.

Still referring to FIG. 2, each shoulder annular portion B has an axial extension less than or equal to 35% of the axial extension of the tread band 8.

Each shoulder annular portion B has a plurality of second grooves 21 extending substantially transversally on the tread band 8.

Also the second grooves 21 preferably have a first segment 24 and a second segment 25, the latter having an axial extension shorter than the first segment 24. The first segment 24 has an axially inner position with respect to the second segment 25.

The second grooves 21 are arranged axially in side-by-side relationship with the first grooves 20 and have an average inclination between 90° and 140°.

The first segment 24 of the second grooves 21 is inclined with respect to the equatorial plane X-X by an angle $\alpha_3$ preferably of more than 120°, for example equal to about 130°.

The second segment 25 of the second grooves 21 is inclined by an angle $\alpha_4$ greater than $\alpha_3$.

The second segment 25 of the second grooves 21 is inclined with respect to the equatorial plane X-X by an angle $\alpha_4$ preferably of more than 130°, for example equal to about 140°.

Preferably the second grooves 21 are arranged so that their axially innermost free end 31 points towards the intersection area 30 of the first 22 and second 23 segments of the first grooves 20. Advantageously, the first grooves 20 and the second grooves 21 remain separated from one another. Preferably, the separation area between the first grooves 20 and the second grooves 21 may be at least equal to the width of the grooves themselves. In a preferred embodiment, such separation area has a width (measured in the axial direction) equal to at last 6 mm. In the Applicant's view, keeping a separation area between the first grooves 20 and the second grooves 21 allows a very good wear evenness to be obtained when the tyre is used for sport purposes (for example, on a track).

Preferably, the second grooves 21 do not have a constant width along their extension, having instead a variable width.

In detail, the first segment 24 has a width increasing from its free end towards the intersection area 32 with the second segment 25.

In detail, the first segment 24 may have a width greater than or equal to about 3 mm at its free end.

In a similar way, the second segment 25 has width increasing from its free end towards the intersection area 32 with the first segment 24.

In detail, the second segment 25 may have a width greater than or equal to about 4 mm at its free end.

The second grooves 21 may have a depth which decreases diminishing from the equatorial plane X-X towards the shoulders. Preferably, the second grooves 21 have a depth less than or equal to 6 mm, more preferably less than 5 mm.

Each shoulder portion B further has a plurality of third grooves 26 extending substantially transversally on the tread band 8.

The third grooves 26 are preferably shorter than the second grooves 21.

In detail, the third grooves have a first segment 27 and a second segment 28. The first segment 27 has an axially inner position with respect to the second segment 28.

The third grooves 26 are circumferentially arranged at the free end of the second segment 23 of the first grooves 20 and have an average inclination between 90° and 140°.

In each shoulder portion B, the third grooves 26 alternate with the second grooves 21.

In detail, each third groove 26 is followed in the circumferential direction by a second groove 21 so as to keep a substantially constant distance between second groove 21 and third groove 26 in the region corresponding to greater camber angles.

In the Applicant's view, such a choice translates into a driving evenness of the tyre while leaning in a bend. In this condition, no sensation of instability is transmitted to the driver of the motor vehicle.

The first segment 27 of the third grooves 26 may be inclined by an angle $\alpha_5$ with respect to equatorial plane X-X of more than 130°, for example equal to about 140°. The second segment 28 of the third grooves 26 is inclined by an angle $\alpha_6$ smaller than $\alpha_5$.

In detail, the second segment 28 of the third grooves 26 may be inclined by an angle $\alpha_6$ with respect to the equatorial plane X-X of more than 120°, for example equal to about 130°.

Preferably, the third grooves 26 do not have a constant width along their extension, having instead a variable width.

In detail, the first segment 27 has a width increasing from its free end towards the intersection area 33 with the second segment 28.

In detail, the first segment 27 may have a width greater than or equal to about 3 mm at its free end.

In a similar way, the second segment 28 has width increasing from its free end towards the intersection area 33 with the first segment 27.

In detail, the second segment 28 may have a width greater than or equal to about 4 mm at its free end.

The third grooves 26 may have a depth which decreases diminishing from the equatorial plane X-X towards the shoulders. Preferably, the third grooves 26 have a depth less than or equal to 6 mm, more preferably less than 5 mm.

In the preferred embodiment shown in FIG. 2, in axially outermost portions, having a width indicated by "s", of the tread band (close to point "E" of FIG. 1) the pattern has no grooves, i.e. it defines a void-to-rubber ratio equal to zero.

This choice allows both a considerable increase in the area of the contact region between tyre and ground when running on a bend at the maximum camber angle on dry grounds, and the formation of a closed ring in the tread band which increases the stiffness of the same, above all with respect to shear stresses (i.e. in the plane of the lateral and longitudinal contact forces). The lack of grooves in a small region in an axially outer position of the tread band does not compromise the run on wet grounds, since on wet grounds one does not reach high lean angles when running on a bend. The width "s", measured on the lateral development of the tread band, of the axially outermost portions having a zero void-to-rubber ratio may range from zero to a maximum of about 35 mm. Preferably, a width of at least 5 mm is left free from grooves in the tread band of tyre adapted to be mounted on the front wheel of a motor vehicle, particularly for the Supersport segment.

In the following, in table 1, the drive results obtained comparing two tyre sets mounted on the wheels of a motor vehicle (Suzuki GSX 1000) are reported.

In particular, the second set has a front tyre according to the invention, with a front size 120/70 R17, while the first set has a comparison front tyre manufactured by the same Applicant, of the same size.

The front tyres of the two sets differs in the pattern of the tread band and in the void-to-rubber ratio, but have the same carcass and belt structure. In particular, the void-to-rubber ratio of the front tyre of the first set (comparison) is equal to about 12%, while the void-to-rubber ratio of the front tyre of the second set (invention) is equal to about 7.5%.

In table 1 the assessments obtained from the tyre according to the invention as compared with the comparison tyre are reported for four parameters: manoeuvrability on wet grounds, draining, behaviour predictability and controllability.

TABLE 1

| | Camber angle | 1st Set (comparison) | 2nd Set (invention) |
|---|---|---|---|
| Manoeuvrability on wet grounds | | 3.80 | 3.80 |
| Front tyre draining | 0° | 4.00 | 4.00 |
| | 0° > 10° | 3.80 | 3.80 |
| | 10° > 20° | 3.80 | 3.90 |
| Behaviour predictability | | 4.00 | 4.00 |
| Controllability | | 4.00 | 4.00 |

The tyre according to the invention has an overall behaviour comparable with that of the comparison tyre for all of the assessed features and an even better one as to draining on bends with lean angles of more than 10°. The tyre has therefore a behaviour on wet road grounds comparable to that of a tyre of the Applicant already highly appreciated by motorcyclists due to its very good features of handling, grip, manoeuvrability and stability also at high speeds, as well as a better draining behaviour at certain lean angles. This latter feature is surprising considering the greater void-to-rubber ratio of the comparison tyre, and indicates the design especially oriented also for use on wet grounds.

The present invention has been described with reference to some embodiments thereof. Many modifications can be made in the embodiments described in detail, still remaining within the scope of protection of the invention, defined by the following claims.

The invention claimed is:

1. A motor vehicle tyre comprising a tread band extending around an axis of rotation, comprising:
    a central annular portion which straddles an equatorial plane, and two annular shoulder portions arranged on axially opposite sides of the central annular portion,
    the tread band having a void-to-rubber ratio of less than 10%;
    the central annular portion having an axial extension less than 50% of lateral development of the tread band and comprising at least a pair of first grooves extending substantially longitudinally on opposite sides of the equatorial plane;
    each shoulder portion having an axial extension less than 35% of the lateral development of the tread band and comprising a plurality of second grooves and a plurality of third grooves, each of the second and third grooves being spaced from the first grooves and extending substantially transversally forming an average angle with the equatorial plane of more than 90°,
    wherein the central annular portion has a void-to-rubber ratio more than 0.15 and each of the first grooves consists of a first segment and a second segment which is inclined with respect to said first segment so as to form a concavity directed toward the equatorial plane,
    the first segment of each first groove being shorter than the second segment and preceding the second segment in a tyre rolling direction,
    each groove of the plurality of second grooves consisting of a substantially linear first segment and a substantially linear second segment, and an inclination angle of the first segment of each second groove with respect to the equatorial plane is smaller than that of the second segment of each second groove with respect to the equatorial plane,
    each groove of the plurality of third grooves consisting of a substantially linear first segment and a substantially linear second segment, and an inclination angle of the first segment of each third groove with respect to the equatorial plane is greater than that of the second segment of each third groove with respect to the equatorial plane; and
    the first grooves of each pair defining a central annular sub-portion straddling the equatorial plane substantially without grooves, the central annular sub-portion having a void-to-rubber ratio substantially equal to zero and an axial extension equal to at least 5% and at most 15% of the lateral development of the tread band.

2. The tyre according to claim 1, wherein a circumferential extension of the first grooves is less than 6% of overall circumferential development of the tyre.

3. The tyre according to claim 1, wherein the first segment of each first groove has an inclination of less than 45° with the equatorial plane.

4. The tyre according to claim 1, wherein the second segment of each first groove has an average inclination of more than 90° with the equatorial plane.

5. The tyre according to claim 1, wherein the first grooves of each pair of first grooves are mutually staggered in a circumferential direction.

6. The tyre according to claim 5, wherein the first grooves of each pair of first grooves are mutually staggered in the circumferential direction by not more than half of a pitch.

7. The tyre according to claim 1, wherein the second segment of each second groove is shorter than the first segment of each second groove.

8. The tyre according to claim 7, wherein the first segment of each second groove has an inclination of more than 120° with respect to the equatorial plane.

9. The tyre according to claim 7, wherein the second segment of each second groove has an inclination of more than 130° with respect to the equatorial plane.

10. The tyre according to claim 1, wherein the third grooves are shorter than the second grooves.

11. The tyre according to claim 1, wherein the third grooves alternate in a circumferential direction with the second grooves.

12. The tyre according to claim 1, wherein the first and second segments of the third grooves have an inclination of less than 150° with respect to the equatorial plane.

* * * * *